Dec. 29, 1959   R. M. HARDGROVE   2,918,697
SLAG TANK DESIGN FOR PRESSURE FURNACES
Filed July 1, 1955   2 Sheets-Sheet 1

INVENTOR.
RALPH M. HARDGROVE
BY
*J. P. Moran*
ATTORNEY

Dec. 29, 1959 R. M. HARDGROVE 2,918,697
SLAG TANK DESIGN FOR PRESSURE FURNACES
Filed July 1, 1955 2 Sheets-Sheet 2
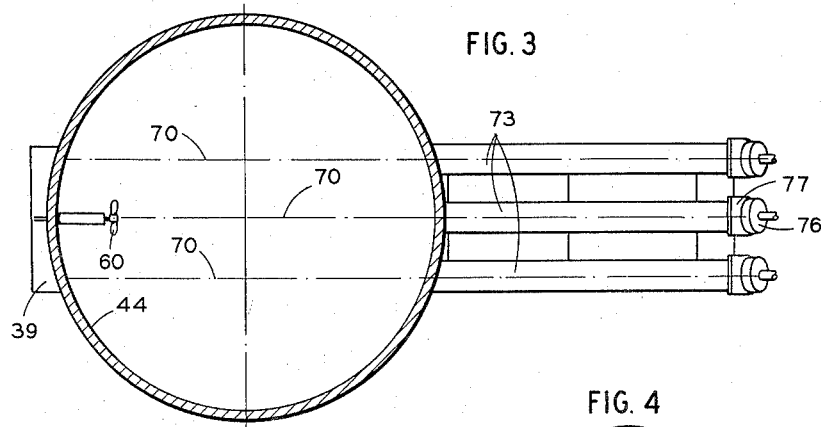
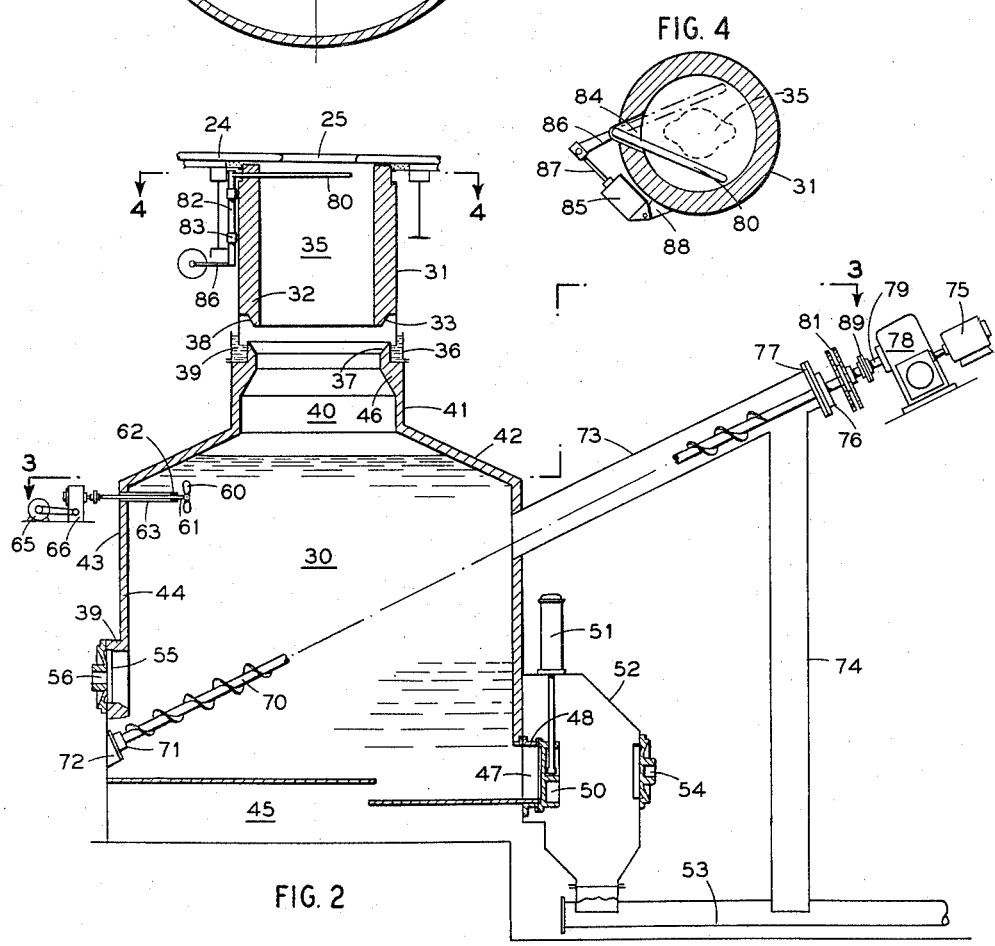
INVENTOR.
RALPH M. HARDGROVE
BY
*J. P. Moran*
ATTORNEY

United States Patent Office 2,918,697
Patented Dec. 29, 1959

2,918,697

SLAG TANK DESIGN FOR PRESSURE FURNACES

Ralph M. Hardgrove, North Canton, Ohio, assignor to The Babcock & Wilcox Company, New York, N.Y., a corporation of New Jersey Application July 1, 1955, Serial No. 519,520

1 Claim. (Cl. 18—2.4)

This invention relates to slag tap furnaces and, more particularly, to an improved design of slag tank or slag receiver therefor.

Most known solid and liquid combustible materials have an ash content, particularly those combustible materials used commercially for heat generation. As the ash is substantially non-combustible, it appears as a residue of the combustion process and must somehow be disposed of. If the operating temperature of the furnace is above the fusion point of the ash, the latter becomes molten to form a slag which may be re-solidified for effective disposition. As any non-molten part of the ash is carried off in the stack gases and thus pollutes the air, it is desirable to operate the furnace at a temperature sufficiently above the fusion point of the ash of the furnace fuel so as to assure all the ash being melted to form slag.

These criteria have led to the development of slag tap furnaces in which molten ash, accumulating on the floor of the furnace, is periodically or continuously tapped through a slag outlet into a slag tank or receiver in which the molten slag falls into a liquid coolant such as water, and is solidified.

It is desirable to provide means for crushing such solidified slag for easy removal thereof from the slag tank, as by sluicing or other means. This has led to proposals for means to assure breaking of the slag into small pieces as it is solidified by contact with the coolant. Another problem encountered has been the blocking of the slag outlet of the furnace by accumulations of solidified or solidifying slag building upon its periphery.

The present invention is directed to an improved slag tank construction inhibiting slag accumulation at the slag outlet and including novel water jet means for breaking up the slag as it falls into the coolant. A further feature is the provision of improved means for removing slag from the slag tank.

Slag accumulation at the slag throat or outlet is inhibited by providing a throat having a cross sectional area substantially larger than normal. While it has been proposed hitherto to use a stream or jet of water or coolant to break up the slag, such streams have been directed radially or tangentially of the tank. With radial jets or streams, the effective velocity at the center of the tank is substantially zero, even though the tank center is the zone where entering slag is most frequently located. With tangential jets or streams, the force of the moving water is exerted outside the central zone and is thus of little or no effect.

The present invention directs a stream or jet of coolant at high velocity diametrically of the tank, and thus the jet has a major slag breaking effect right across the central zone. This results in more efficient breaking up of the slag for the same relative amount of power input.

For an understanding of the invention principles, reference is made to the following description of a typical embodiment thereof as illustrated in the accompanying drawings. In the drawings:

Fig. 2 is a longitudinal vertical sectional view through a slag tank embodying the invention;

Fig. 3 is a transverse sectional view taken on the line 33 of Fig. 2; and

Fig. 4 is a vertical sectional view taken on the line 4—4 of Fig. 2.

Figure 1:
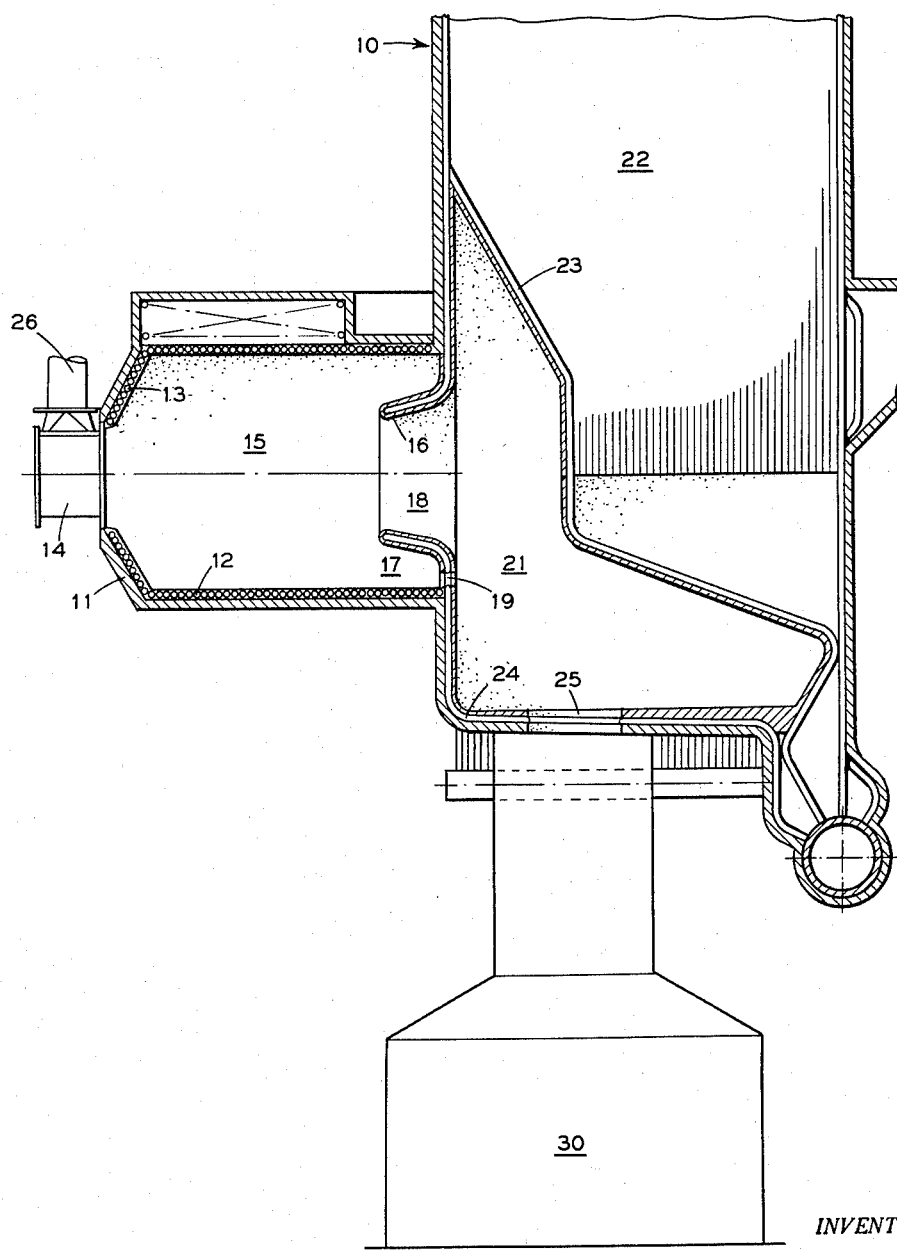
Fig. 1 is a partial longitudinally vertical section of a steam generator having a slag tap combustion chamber connected to the slag tank of the present invention.

Referring to Fig. 1, the slag tank of receiver 30 of the invention is illustrated as used with a pressure fired steam generating and superheating unit 10 whose fuel is burned in a cyclone furnace 15 of the general type disclosed in U.S. Patent 2,357,301. The cyclone combustion chamber or furnace 15 comprises a cylindrically shaped shell or barrel 11 of circular cross section and arranged with its axis substantially horizontal. The barrel 11 is lined by refractory covered, studded fluid-cooled tubes 12 arranged side-by-side in generally semi-circular loops connected to fluid inlet and outlet heaters which are not shown as they form no part of the invention.

The outer or front end of the cyclone is formed by a frusto-conical end portion 13 formed by similar refractory covered, fluid-cooled tubes and a central cylindrical inlet casing 14 concentric with the barrel 11. The opposite end of the cyclone furnace is provided with a tube and refractory construction forming an outwardly flaring frusto-conical throat 16 which, with the barrel 11, defines an annular pocket 17 surrounding a gas outlet or throat passage 18. The tubes forming the wall 16 are extended to form an upright wall of a primary furnace 21 which, with a radiation chamber 22 separated therefrom by an inclined baffle 23, forms the lower portion of the pressure-fired steam generating and superheating unit 10. The lower part of the pocket 17 is provided with a slag discharge port 19 opening into the primary furnace 21, so that any molten slag accumulating in the bottom of furnace 15 will discharge through opening 19 and across floor 24 of primary furnace 21, through a slag outlet 25 therein, and thence into the slag tank 30 of the invention.

Suitable fuel burner means, such as an oil burner or coal burner, is inserted into the inlet casing 14 with the axis of the burner coinciding with the axis of cyclone furnace 15. Inlet section 14 is provided with a tangential or involute connection into an inlet duct 26 for the introduction of primary air.

Referring to Figs. 2, 3 and 4, slag discharging through outlet 25 flows through a substantially cylindrical discharge spout 35 forming an entry section for receiver 30. Spout 35 is formed by a metal casing 31 having a refractory lining 32 supported on an annulus 33 on the lower inner surface of casing 31, and is fixed relative to the floor 24 of primary furnace 21.

The lower end of casing 31 has a pressure tight expansion connection to the inlet 40 of receiver 30. To form this connection, an annular channel construction 36 is secured on the upper end of metal casing portion 41 of inlet 40, and has an inner sloping flange 37 substantially parallel to and adapted to mate with a sloping flange 38 on annulus 33. Channel construction 36 contains water or other sealing fluid 39 to substantially above the lower edge of casing 31 which extends into channel 36.

Metal casing portion 41 is connected by a frusto-conical transition casing portion 42 to an enlarged, main cylindrical casing portion 43 forming the body of receiver 30. Casing sections 41, 42 and 43 are provided with an inner refractory lining 44 of substantially uniform thickness except adjacent the upper end of section 41 where lining 44 is increased in thickness as indicated at 46. Receiver 30 has its bottom formed by a metal plate or plates 45 sloped to form a trough leading to a slag sluicing outlet 47.

Outlet 47 is surrounded by a cylindrical ring 48 on the outer surface of receiver 30, this ring forming a guide for a valve 50 operated by a fluid pressure actuator 51 mounted on the upper surface of a sealed outlet hopper or tank 52 discharging into a conduit 53. An access door 54 is mounted in hopper 52 opposite valve 50. Tank or receiver 30 is provided with a refractory lined access opening 55 substantially diametrically opposite and slightly above slag sluicing outlet 47, opening 55 being sealed by a cover 56 which may be provided with an observation port.

In operation, tank or receiver 30 is filled with water or other liquid coolant to a point just below neck 40. Molten slag flowing through outlet 25 from furnace 21 falls into this water and is cooled and solidified thereby. The slag follows a path centered on the axis of outlet 25 and thus on the axis of tank 30. As there is a tendency for the slag to solidify in relatively large masses, it is necessary to break up such masses into smaller pieces for easier removal from tank 30.

In accordance with the invention, breaking up of the slag is effected by directing a high velocity stream or jet of coolant diametrically of the tank 30 so as to strike the slag stream just after the latter reaches the coolant and is chilled and solidified. This high velocity stream striking the solidified slag breaks the latter into much smaller pieces.

This high velocity jet or stream of coolant is provided by a rotatable propeller or impeller 60 mounted on a shaft 61 rotatable in sealed bearings 62 in a tube 63 extending through the wall of the lower section of receiver 30. Shaft 61 is rotated by a motor 65 driving a gear reducer 64, the motor and gear reducer being suitably supported on casing section 43.

The solidified slag broken up by the high velocity jet or stream of coolant driven diametrically of receiver 30 by propeller 60 may be removed from the slag tank or receiver by a multiple screw conveyor arrangement extending across the tank at an angle to the horizontal. This arrangement comprises three screw conveyors 70 having their inner ends engaged in bearings 71 on a support 72 in a lateral extension 39 of tank 30, the access opening 55 also being in this extension.

Conveyors 70 extend upwardly across tank 30, the middle conveyor lying in a diametric plane and the outer conveyors lying in vertical planes parallel to such diametric plane. At the opposite side of the slag tank, the conveyors extend outwardly through cylindrical housings 73 of larger diameter than the conveyors, the latter being tangent to the lower inner surfaces of housing 73. The upper portion of each housing 73 is connected by a pipe or conduit 74 to slag discharge conduit 53.

The outer ends of the conveyor shafts extend through bearings 76 in end plates 77 closing the ends of housings 73. The conveyors are rotated in unison by a motor 75 driving a gear reducer 78 having its output shaft 79 connected by a coupling 89 to the shaft of the middle conveyor. This latter shaft has secured thereto a twin sprocket 81 which, through chains, drives sprockets (not shown) fixed to each of the other conveyor shafts.

When conveyors 70 are rotated, the slag is drawn into housings 73 and falls through pipes 74 into discharge conduit 53. Slag may also be discharged by opening valve 50 to sluice the slag into conduit 53.

Slag solidifying at outlet 25 is broken away from the outlet by a slag knocker or wiper comprising an arm 80 fixed to the upper end of a shaft 82 mounted in bearings 83 on casing section 31. Arm 80 extends through a slot 84 in section 35 and across this section. On the lower end of shaft 82 is fixed an arm 86 connected to the piston rod 87 of a fluid pressure actuator 85 swingably supported on an ear 88 on casing section 31. Actuator 85 oscillates arms 80 across outlet 25 to knock slag from the outlet.

While a specific embodiment of the invention has been shown and described in detail to illustrate the application of the invention principles, it will be understood that the invention may be embodied otherwise without departing from such principles.

What is claimed is:

In combination with a slag tap furnace having a bottom discharge outlet for molten slag; a slag receiver comprising a relatively large cross-section container for containing a liquid coolant substantially filling said container; said container having a smaller cross-section substantially central top inlet in aligned communication with said outlet, whereby molten slag falls substantially centrally down through said outlet, said inlet, and said container; and a screw propeller mounted adjacent a side wall within said container, immediately below the surface of the liquid in said container, with its propelling direction extending substantially horizontally across the container and intersecting the path of downward movement of the slag through the liquid to circulate a high velocity stream of the liquid across such path to break up slag solidified during such downward movement through the coolant.

References Cited in the file of this patent

UNITED STATES PATENTS

| 972,418 | Vautin | Oct. 11, 1910 |
| 1,680,183 | Szikla | Aug. 7, 1928 |
| 1,834,687 | Davis | Dec. 1, 1931 |
| 1,916,402 | Allen | July 4, 1933 |
| 2,163,148 | Linder | June 20, 1939 |
| 2,471,559 | Dolezal | May 31, 1949 |
| 2,630,623 | Chisholm et al. | Mar. 10, 1953 |
| 2,636,483 | Bailey et al. | Apr. 28, 1953 |

FOREIGN PATENTS

| 2,039 | Great Britain | 1876 |

OTHER REFERENCES

B and W Central Station Boilers, Bulletin G67–A, Copyright 1950, page 40.